United States Patent [19]

Koch

[11] Patent Number: 4,638,587
[45] Date of Patent: Jan. 27, 1987

[54] DISPOSABLE CASTING AID

[76] Inventor: Alexander W. Koch, P.O. Box 847, Winchester, Oreg. 97495

[21] Appl. No.: 733,601

[22] Filed: May 13, 1985

Related U.S. Application Data

[63] Continuation-in-part of Ser. No. 718,536, Apr. 1, 1985, abandoned.

[51] Int. Cl.$^4$ ............................................. A01K 91/02
[52] U.S. Cl. ..................... 43/43.12; 43/43.1; 43/44.88
[58] Field of Search ................ 43/43.12, 42.04, 44.88, 43/43.1, 42.74, 44.81

[56] References Cited

U.S. PATENT DOCUMENTS

| | | | |
|---|---|---|---|
| 2,687,592 | 8/1954 | Purcell | 43/44.81 |
| 2,884,735 | 5/1959 | Ticer | 43/43.12 |
| 2,958,976 | 11/1960 | Adams | 43/43.12 |
| 3,077,694 | 2/1963 | Cox | 43/43.12 |
| 3,081,574 | 3/1963 | Wise | 43/43.12 |
| 3,341,966 | 9/1967 | Pippen | 43/43.12 |
| 3,401,483 | 9/1968 | Bellah | 43/43.1 |
| 3,878,636 | 4/1975 | George | 43/43.12 |

Primary Examiner—Nicholas P. Godici
Assistant Examiner—Kurt Rowan
Attorney, Agent, or Firm—Eugene M. Eckelman

[57] ABSTRACT

An aid for temporary attachment of a fish line to facilitate casting a lightweight lure or bait some distance to a desired location. An elongate body member has an arm at one end for engagement with a fishing line. A disposable weight is carried by the casting aid to provide desired momentum to a cast line. A buoyant body on the aid is acted upon by water displacement and/or by submersion to rotate the arm of the aid out of line engagement for release of the aid. The buoyant body may be of rounded shape for aerodynamic purposes. The buoyant body may be formed having an airfoil shape to assure positive engagement of the aid with the lure or bait during the cast.

7 Claims, 9 Drawing Figures

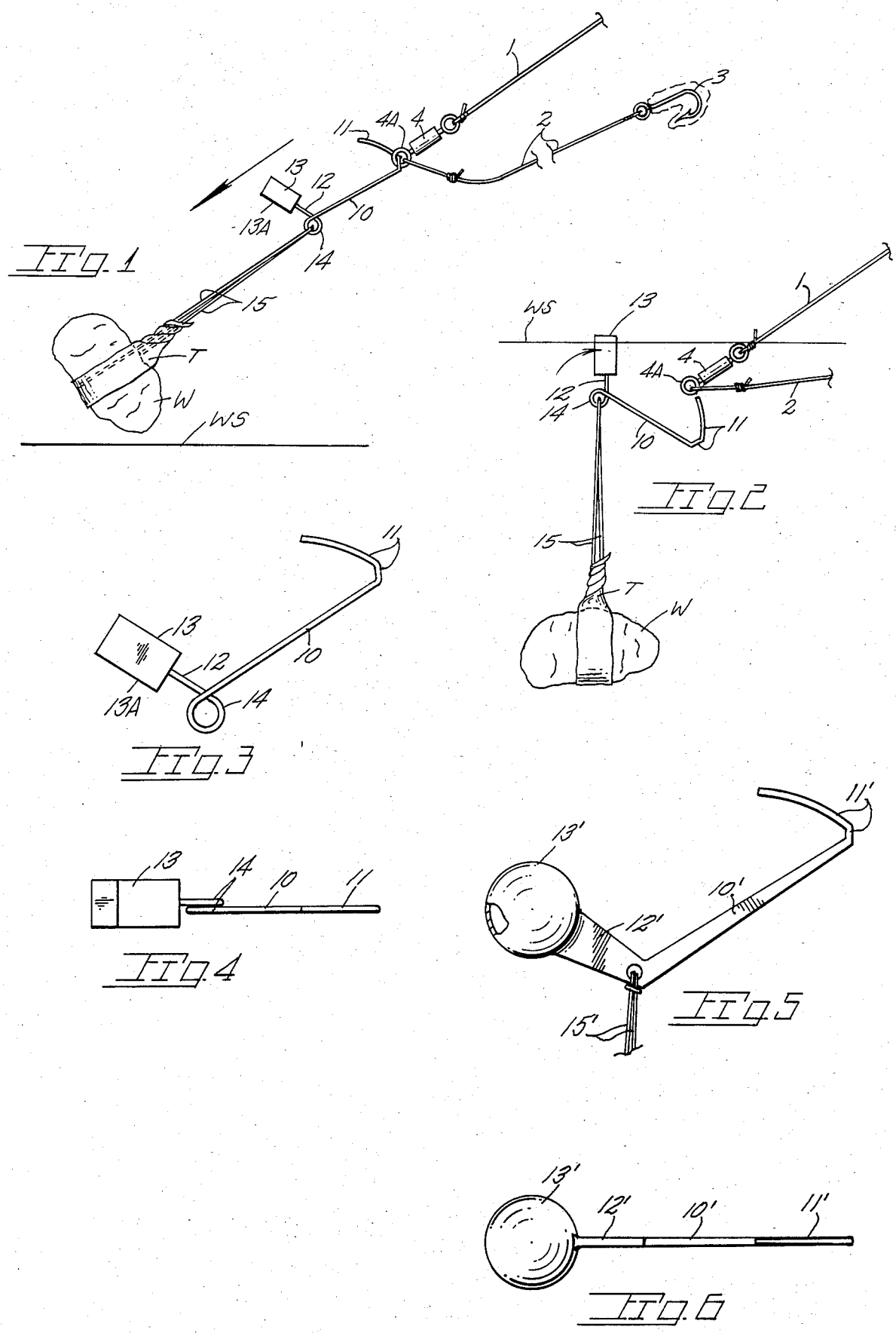

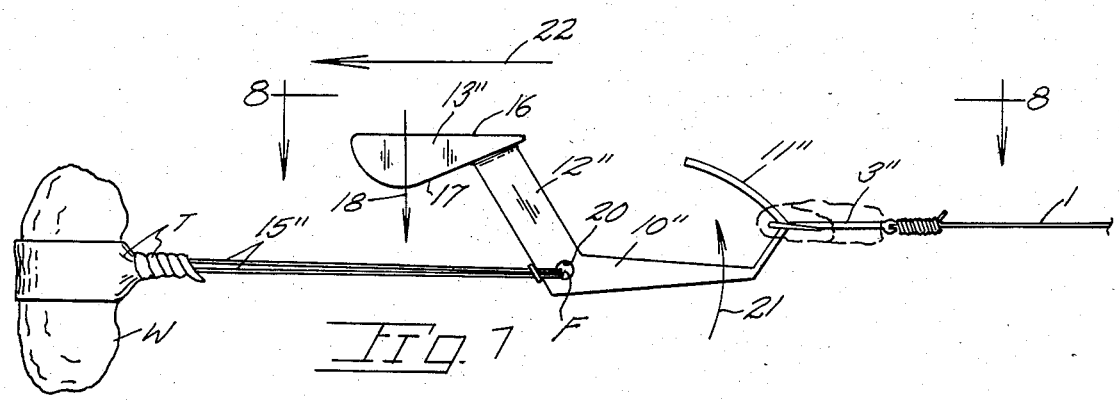
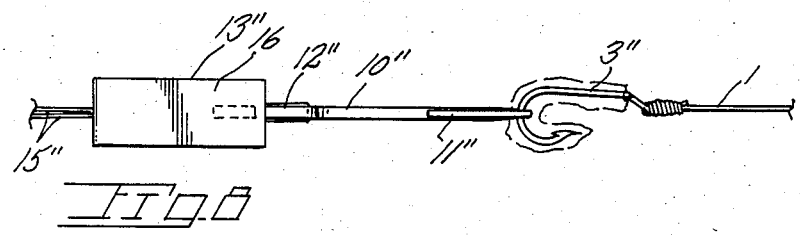
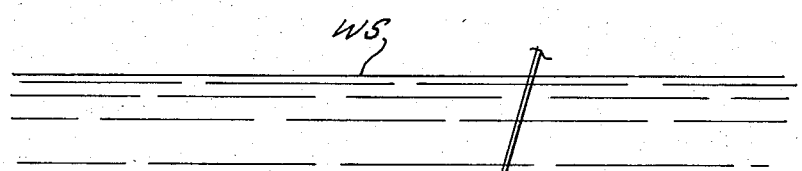
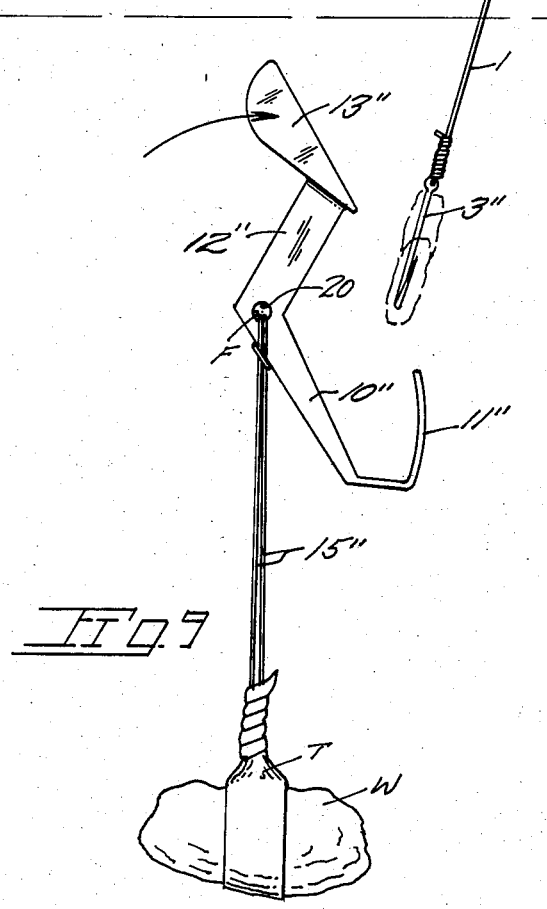

DISPOSABLE CASTING AID

BACKGROUND OF THE INVENTION

This application is a continuation-in-part application of a copending earlier application filed by the same inventor on April 1, 1985, under Ser. No. 06/718,536 and bearing the same title now abandoned.

The present invention pertains generally to fishing gear and particularly to an aid temporarily attached to a fishing line to facilitate casting of same.

A problem exists for anglers wishing to cast baits or lures substantial distances. While adding a sinker or other weight to the fishing line will assist in achieving a long cast to a desired location, the weight is undesirable after cast completion as it adversely effects the bait or lure and on the playing of any hooked fish. Other inventive efforts have recognized this problem and have attempted to solve same by providing for weight separation from the fishing line upon weight contact with the water. For example, U.S. Pat. No. 3,077,694 discloses the use of a hook shaped metal plate which is displaced upon impact with the water surface to a line releasing position. A similar arrangement is disclosed in U.S. Pat. No. 2,687,592 wherein a plate impacts the water surface and is thereby rocked out of engagement with a sinker. The same patent discloses the equipping of a hook shank and a lure body with an angulated arm on which a weight is carried with tipping of the arm upon water contact by the bait or lure resulting in weight release. Still other detachable weight arrangements include water soluble bodies attaching a weight to a fishing line permitting detachment of the weight upon submersion as disclosed in U.S. Pat. No. 2,754,614. U.S. Pat. No. 2,741,059 discloses a device for weighting a flycasting line which separates from the lure upon impact with the water surface. U.S. Pat. No. 2,791,860 discloses a weight carried by the point of a fish hook with hook separation occurring at the time of water impact.

While the prior art devices are intended to provide suitable weight to a bait or lure being cast, the manner of achieving same varies substantially from the present invention.

SUMMARY OF THE PRESENT INVENTION

The present invention is embodied within a disposable casting aid of low cost manufacture which achieves consistent separation from the fishing line at the completion of the cast.

The casting aid includes an elongate main body member having one end for inserted engagement with a fishing line such as through a swivel eye or about the curved segment of a fish hook. The remaining end of the main body member carries, in an offset manner, an enlarged buoyant member of extremely light density material, such as balsa wood, Styrofoam (a registered Trademark), hollow, etc. Said buoyant member is shaped so as to be repositioned upon water displacement and by reason of being buoyant, provides a back-up line releasing feature in that weight separation may also occur upon flotation of the buoyant member causing repositioning the main body member. A throwaway weight, such as for example a small rock, may be attached to the casting aid in a bridled manner. For reasons of low cost production, the elongated body may be automatically formed from wire or molded plastic. The buoyant member preferably includes airfoil surfaces to produce lift to assure engagement of the aid with the lure for the duration of the cast.

Important objectives of the present casting aid include the provision of such an aid being of extremely low manufacturing cost and adapted to permit the user to readily attach whatever weighted body is most suitable; the provision of a casting aid which has very high release reliability for the reason that disengagement from the fishing line may occur from either of two events which occur with each cast; the provision of a casting aid which permits the fishing line and leader to be of standard configuration so as to not hinder the chances of fishing success; the provision of a casting aid having a buoyant member of airfoil shape to maintain the aid during flight in positive engagement with the lure or bait to prevent premature release of the aid during a cast.

BRIEF DESCRIPTION OF THE DRAWINGS

In the accompanying drawings:

FIG. 1 is an elevational view of the cast end of a fishing line, leader and baited hook with the present casting aid attached thereto prior to water displacement;

FIG. 2 is a view similar to FIG. 1 with the parts shown immediately subsequent to submersion;

FIG. 3 is a side elevational view of the elongate main body member and light density buoyant member of the present invention;

FIG. 4 is a top plan view thereof;

FIG. 5 is a view similar to FIG. 3 but showing a modified form of the elongate main body member with an entrapped air float 13;

FIG. 6 is a top plan view of FIG. 5;

FIG. 7 is a side elevational view of a modified form of the casting aid in flight;

FIG. 8 is a plan view taken downwardly along line 8—8 of FIG. 7; and

FIG. 9 is a side elevational view of the aid below the water surface.

DETAILED DESCRIPTION OF THE PREFERRED EMBODIMENTS

With continuing attention to the drawing wherein parts identified with reference numerals are similarly hereinafter identified, the reference numeral 1 indicates a fishing line intended to be cast.

The term fishing line as presently used comprehends a leader at 2, hook 3. A swivel at 4 may be part of the fishing line as it conveniently provides an eye at 4A through which a later described arm of the aid may pass. Other fishing line arrangements may be utilized to receive said arm as later described.

The present casting aid includes an elongate main body member 10 which may be formed from wire with an arm 11 integral with one end. Said arm is shaped in an angular curved manner to retain the main body member 10 on fishing line 1 during casting when substantial centrifugal forces are imparted to the casting aid. The remaining end of elongate main body member 10 is integral with an extension at 12 and extends outwardly or laterally from said main body member to receive a low density buoyant member 13 shown as a block of balsa wood, air entrapped float, molded cellular material, Styrofoam (a registered Trademark), or cork and having a displacement surface area 13A. Assembly of the aid is simplified if the block of wood, Styrofoam (a registered Trademark), or cork is soft enough to permit the end of extension 12 to be pressed into same. The elongate main body member when formed of wire is bent to form an eye 14 through which a bridle 15 may pass. The two runs of the bridle may be economically fastened to a weight W such as a small rock by means of a length of twisted tape T. Other such disposable weights may of course be utilized.

In use, the low density buoyant member's surface area 13A displaces the higher density water below surface WS at the end of a cast to create dynamic forces which rotate the elongate member per the arrow of FIG. 2 to cause arm 11 to be withdrawn from fishing line engagement. The fishing line may include a swivel for arm engagement as shown or have a looped portion of the line for arm engagement. If desired, the arm 11 may be temporarily attached to the curved segment of the fishhook during a cast.

Best results are achieved with the present casting aid when a side cast is made rather than an overhead cast. The inertia of the weight W results in a cast achieving the desired distance which would otherwise not be possible with an unweighted fishing line. Water displacement by the buoyant body results in rotation of same as shown in FIG. 2 causing the arm to be extracted from the fishing line, swivel, hook, etc. As the angle at which the buoyant member approaches the water surface may vary and desired impact not achieved, the low density buoyant nature of member 13 will cause same to rotate when submerged in the higher density water to effect arm extraction. Under certain conditions arm extraction may not occur until the weight has settled to the stream or lake bottom without adverse consequences.

A modified form of disposable casting aid shown in FIGS. 5 and 6 is embodied in a molded article with components thereof identified with prime reference numerals corresponding to numerals used in the above description of the first form of the invention. The buoyant member 13' is of spherical shape and preferably hollow. The elongate member 10' is apertured to receive the weight retaining bridle 15' which is inserted through the aperture with the weight being looped through a looped segment of the bridle.

In FIG. 7 a preferred form of the casting aid is shown somewhat enlarged wherein the buoyant member at 13" is an airfoil having upper and lower surfaces 16 and 17 which produce lift directionally represented by an arrow 18. Additional casting aid structure includes an elongate main body member 10" terminating rearwardly in an integral arm 11" which extends in a reversed or hooked manner back towards buoyant member 13". Said main body member 10" includes a forwardly extending extension 12" which terminates at a trailing portion of lower surface 17 of the buoyant member. A casting weight W as earlier described includes a bridle 15" and holding tape T, the upper end of the bridle being looped through an aperture at 20 in the main body member.

The lure or baited hook at 3" is engaged with arm 11" prior to and during the cast per FIG. 7 with aerodynamic forces urging the arm 11' into lure engagement at arrow 21 in the direction of arrow 18 about a fulcrum F at aperture 20. The arm 11 is urged by aerodynamic forces in a direction substantially normal to the line of flight at arrow 22.

Per FIG. 9, once submerged, the buoyant member exerts a lifting force about fulcrum F to reposition arm 11" to the inclined, lure releasing position shown.

The casting aid shown in FIGS. 7-9 may be of molded construction with one suitable material being polypropylene with the buoyant member being of a light density by the addition of celogen to the buoyant member during molding.

The airfoil shaped buoyant member 13" acts about fulcrum F with extension 12" being a lever to urge arm 11" along a vector generally perpendicular to the line of flight and hence assuring continued engagement of the arm with the lure for duration of the cast.

While I have shown but a few embodiments of the invention, it will be apparent to those skilled in the art that the invention may be embodied still otherwise without departing from the spirit and scope of the invention.

Having thus described the invention, what is desired to be secured by Letters Patent is:

1. A disposable casting aid for temporary attachment to and automatic release from a fishing line, said aid comprising, an elongate main body member having a hook-shaped arm at one end for releasable hook engagement with the fishing line, a buoyant member of low density material located at the other end of said elongate main body member, and a casting weight attached to said main body member at a point intermediate the ends thereof, said point of attachment of said casting weight constituting a fulcrum about which said buoyant member may act to rotate said body member in the water, said buoyant member upon being submerged rotating said main body member and said arm thereon to disengage said hook-shaped arm and thus the casting aid from the fishing line.

2. The disposable casting aid claimed in claim 1 wherein said buoyant member is of greater transverse section than said extension.

3. The disposable casting aid claimed in claim 1 wherein said buoyant member is of circular shape in at least one transverse section.

4. The disposable casting aid claimed in claim 1 wherein said buoyant member is of spherical shape.

5. The disposable casting aid claimed in claim 1 wherein the buoyant member is of an airfoil shape and arranged to urge rotation of said arm on said fulcrum in a direction which is generally normal to the direction of casting aid flight and which maintains the arm in hooked position on the line to assure aid attachment to a fishing line for the duration of a cast.

6. The disposable casting aid claimed in claim 5 wherein said airfoil has flat and curved surfaces.

7. The disposable casting aid claimed in claim 1 wherein said main body member includes an extension, said buoyant member being carried at one end of said extension, said extension constituting a lever imparting forces on the remaining portion of the body member about said fulcrum during both flight of the casting aid and during initial submersion of the casting aid.

* * * * *